Patented Oct. 24, 1950

2,526,837

UNITED STATES PATENT OFFICE 2,526,837

MAGNESIA CEMENTS AND PROCESS OF MAKING

Teynham Woodward, Los Altos, Calif., assignor to Kaiser Aluminum & Chemical Corporation, a corporation of Delaware No Drawing. Application April 19, 1948,
Serial No. 21,850

12 Claims. (Cl. 106—106)

This invention relates to an improved cementitious material and methods of making the same, and particularly to cements of the Sorel type, such as magnesium oxychloride cements.

Sorel cements, as is well known, are made by treating with a suitable gauging solution an active oxide of magnesium, to obtain cements which have valuable industrial properties. The gauging solution is most frequently aqueous magnesium chloride but it may be magnesium sulfate solution, or a solution of other magnesium halide.

For nearly half a century it has been known that an active oxide of magnesium useful in Sorel cement, can be produced by careful burning at temperatures which minimize sintering. A particular type of magnesia which is most desirable for this purpose is that having caustic burn. In any event, the time and temperature of burning, that is calcining, is critical since these factors govern the activity, or the degree of burn, which in turn controls the time of set of the cement. Obviously the greater the degree of burn the less active the magnesia, and the longer the setting time.

Since most of the magnesia cements are used in light colors and tints, the caustic burn magnesia must be light in color. This requirement has necessitated a relatively pure raw material and has usually been met by selective mining of high grade magnesite and brucite. However, these natural ores of magnesia are expensive when obtained by selective mining and the supply of high grade materials is rapidly decreasing.

Magnesia obtained from the well-known seawater processes is a particularly desirable raw material in terms of purity and color. There is also an adequate supply of such materials available at low cost. Consequently, considerable effort has been given to the use of seawater magnesia in oxychloride cements, but such effort has not met with much success. The reason for this failure is that oxychloride cements made from seawater magnesia have undue shrinkage, although satisfactory tensile and cross bending strengths are obtainable. This undesirable shrinkage is only a small percentage of the entire area of the cement body, but in applications, such as floors and the like, it leads to large cracks and even pulling away from side edges.

Several theories have been advanced to explain the difference between oxychloride cements made from natural ores and those made from seawater magnesia. A theory which is believed to be novel and which may well explain the success of the present invention, is one based on the essential difference between natural magnesia ores and seawater magnesia. One of the unique characteristics of magnesia derived from natural ores is that it is heterogeneous, which is due partly to the nature of the ore particles and their physical form, but is probably determined more by their heterogeneous composition. (At this point it is well to note that in determining setting time as a function of degree of burn it is found that it can in a general way be correlated with surface activity as measured by iodine number. The iodine number herein referred to is determined according to C. L. Mantell, "Adsorption," p. 346, using a 0.05 N solution of iodine in carbon tetrachloride. The higher the iodine number the faster the set, that is, the more active the magnesia.) Magnesia obtained from magnesite results from driving off carbon dioxide and has physical characteristics peculiar to this circumstance, but not at present completely understood. It may be that such magnesia contains a mixture of particles of high activity and of low activity. It has been postulated that the high activity particles may lead to the initial set, whereas the bulk of the material is of low activity and reacts slowly with gradual increase in strength. There may, however, be other, unrecognized or unknown characteristics of magnesia from natural magnesite which determine its hitherto superior action in Sorel cement formation.

However, in the case of oxychloride cement from seawater magnesia all particles tend to react in the same manner and during the same period of time when they are of the same, or approximately the same, activity. This leads to a much higher early strength and less gradual growth. Furthermore, the formation of oxychloride is a highly exothermic reaction; thus, in the case of seawater magnesia, when a large proportion of the particles react during a relatively short period of time such a large quantity of heat is liberated during this time that the rate of evaporation of moisture in the product is so great that the final set is obtained with an excessive amount of shrinkage. On the other hand, if the rate of oxychloride formation is slowed down sufficiently to minimize shrinkage there is no relatively rapid set (2 to 3 hours) which is necessary if the product is to have commercial acceptance.

Whether or not the above theory is correct, it is well-known in the art that seawater magnesia alone has proved an unsatisfactory raw material for oxychloride cement. Several methods have been proposed to utilize seawater magnesia and at the same time overcome the undue shrinkage which occurs with the necessary time of set.

Among the previous methods proposed is the blending of a limited quantity of seawater magnesia with magnesia produced from the natural ores. However, this method is not desirable because only small quantities of seawater magnesia can be employed with the natural magnesia when the latter is burned to the critical temperature for substantially complete reaction. If larger amounts of the seawater material are employed the amount of shrinkage becomes intolerable.

It has now been found that seawater magnesia can be employed as the only source of magnesia in making Sorel cements. One method of so doing is to prepare a Sorel cement, for example magnesium oxychloride, from a mixture of magnesias obtained from seawater and having at least two different degrees of activity. Another method is to maintain the cement during setting in an atmosphere of constant high humidity or even with added surface water to slow down the rate of evaporation.

According to the present invention Sorel cements of excellent final characteristics are obtained by treating with a suitable setting solution a mixed magnesia obtained by calcining at least two batches or portions of magnesium hydroxide, which has been precipitated from a magnesium salt-containing water solution such as seawater, brine, bittern or other, to obtain one magnesia batch or component having an iodine number of from about 4 to about 8 and to obtain at least one other magnesia batch or component having an iodine number of from 15 to 40, and mixing the components together. For instance, where magnesium oxychloride cement is desired the magnesias are treated with magnesium chloride gauging solution, and when magnesium oxysulfate cement is desired the magnesias are treated with magnesium sulfate setting solution. Sometimes it is advantageous to gauge the cement with a setting solution which is a mixture of a magnesium chloride solution and a magnesium sulfate solution.

The lower activity iodine number useful in this invention is magnesia having an iodine number of from about 4 to about 8. The higher activity magnesia has an iodine number of from about 15 to about 40. The magnesia mixture should contain from about 30% to about 70% by weight of the lower activity material and from about 70% to about 30% by weight of the higher activity material. As the iodine number of the more active magnesia approaches the upper portion of the range defined, smaller proportions of this magnesia will be mixed with larger proportions of the magnesia of iodine number 4 to 8, for best results. Preferably, especially in making flooring compositions, the higher activity magnesia has an iodine number of from about 15 to 22. Especially good results are obtained with flooring mixes containing a magnesia mixture composed of from 30% to 40% of magnesia having an iodine number of from 4 to 8, and from 70% to 60% of magnesia of iodine number from 15 to 22. It is generally advantageous to employ a magnesia of iodine number 4 to 8 which also has an ignition loss of around 1.0%, with some variation permissible above or below this figure. The magnesia component of high activity may comprise one magnesia calcined to the desired iodine number, or to within the desired range of iodine numbers, but it may also be a mixture of two or more magnesias, each differing substantially from the other in average iodine number, but the mixture of which exhibits an average iodine number within the desired range; for instance, it may be a mixture of a magnesia of iodine number of 44 and of one of iodine number of about 21, but the mixture whereof exhibits an iodine number of between 15 and 40.

It is believed that the desirable results are achieved because a higher activity magnesia gives the proper initial set, inasmuch as it reacts quickly with the gauging solution, and a lower activity magnesia reacts more slowly with the solution so that heat developed over a given time is less and there is consequently less evaporation of water and little or no shrinkage. In this manner, therefore, the operator is enabled to obtain the necessary rapid set and at the same time to avoid the excessive shrinkage hitherto experienced with this type of magnesia.

The activity of the magnesia is suitably controlled by calcining magnesium hydroxide, which has been precipitated from seawater, brine or other magnesium salt containing solution by treatment thereof with lime or calcined dolomite or other alkaline agent in the manner well-known to the art, the calcination being carried on for such time and at such temperature as will give the desired activity. The lime or calcined dolomite can be added either dry, or as a dry hydrate, or as a slurry. As stated hereinabove, the activity of the magnesia is most conveniently measured by the iodine number. It is believed probable that the advantages of this invention are obtained by setting up different rates of reaction in the cement mass. That is, the most active magnesia particles may hydrate or react with the gauging solution to form a stable network of cementitious material, after which the less active particles proceed to react within this protecting framework and a strong stable mass is obtained within the desired period of time.

The following tables show examples of the method of making the improved Sorel cement of this invention. A total of 30% by weight of seawater magnesias of the activity ratios shown below are admixed with 70% by weight of a commercial flooring composition which is a mixture of talc, wood flour, sand and asbestos. The total mixture is gauged with 20% $MgCl_2$ solution (aqueous), and results obtained are as shown in Tables II and III.

*Table I.—Preparation data*

| Test No | 1 | 2 |
| --- | --- | --- |
| Percent MgO (Iodine No.=36) | 40 | 30 |
| Percert MgO (Iodine No.=4) | 60 | 70 |
| ml. $MgCl_2$ soln./gm. MgO | 1.36 | 1.30 |
| Initial set in minutes | 135 | 135 |
| Final set in minutes | 210 | 270 |

*Table II.—Linear change*

| | Percent expansion (+) or contraction (−) from the start | |
| --- | --- | --- |
| Time in Hours: | | |
| 2.0 | +0.010 | +0.000 |
| 2.5 | +0.040 | +0.002 |
| 3.0 | +0.070 | +0.046 |
| 3.5 | +0.078 | +0.072 |
| 4.0 | +0.078 | +0.087 |
| 4.5 | +0.075 | +0.087 |
| 5.0 | +0.070 | +0.087 |
| 5.5 | +0.068 | +0.086 |
| 6.0 | +0.068 | +0.086 |
| 6.5 | +0.068 | +0.086 |
| 7.0 | | +0.086 |
| 7.5 | | +0.080 |
| 8.0 | | +0.080 |
| 8.5 | +0.062 | |
| 9.0 | | +0.076 |
| 24.0 | +0.062 | +0.071 |
| Max. Expansion | +0.078 | +0.087 |
| Min. Contraction | +0.062 | +0.071 |
| Change from Final set to 24 hrs | −0.016 | −0.016 |

The linear change is measure during the first 24 hours according to the method given in Appendix G of "British Standard Specification for Materials for Use in the Manufacture of Magnesium Oxychloride Flooring Compositions." No. 776. 1938.

*Table III.—Modulus of rupture*

| Age in Days | Lbs. per sq. in. | |
|---|---|---|
| | 1 | 2 |
| 1 | 780 | 630 |
| 3 | 1,100 | 1,030 |
| 7 | 1,220 | 1,350 |
| 14 | 1,600 | ¹1,660 |

¹ 15 days.

This value is measured according to the method given in Appendix F of the above British Standard Specification.

The tables below show a method of carrying out this invention wherein magnesias of 3 different activities are blended in the mixing. In these tests also, 30% by weight to total seawater magnesia is admixed with 70% by weight of the commercial flooring composition described above. The total mixture is gauged with 20% aqueous $MgCl_2$ solution.

*Table IV.—Preparation data*

| Test No. | 4 | 5 | 6 |
|---|---|---|---|
| Per cent MgO (Iodine No. = 44) | 15 | 7.5 | |
| Per cent MgO (Iodine No. = 21) | 35 | 42.5 | 50 |
| Per cent MgO (Iodine No. = 4) | 50 | 50.0 | 50 |
| ml. $MgCl_2$ soln./gm. MgO | 1.36 | 1.32 | 1.40 |
| Initial set in minutes | 150 | 150 | 225 |
| Final set in minutes | 240 | 240 | 375 |

*Table V.—Linear change*

| | Per cent expansion (+) or contraction (−) from the start | | |
|---|---|---|---|
| | 4 | 5 | 6 |
| Time (Hrs.): | | | |
| 2.0 | 0.000 | +0.004 | 0.000 |
| 2.5 | +0.021 | +0.013 | 0.000 |
| 3.0 | +0.056 | +0.037 | 0.000 |
| 3.5 | +0.086 | +0.064 | +0.004 |
| 4.0 | +0.092 | +0.076 | +0.018 |
| 4.5 | +0.086 | +0.074 | +0.035 |
| 5.0 | +0.076 | +0.064 | +0.059 |
| 5.5 | +0.070 | +0.054 | +0.082 |
| 6.0 | +0.062 | +0.046 | +0.100 |
| 6.5 | +0.058 | +0.039 | +0.105 |
| 7.0 | +0.056 | +0.036 | +0.106 |
| 7.5 | +0.055 | +0.035 | +0.107 |
| 8.0 | +0.055 | +0.035 | +0.108 |
| 8.5 | +0.056 | | |
| 24.0 | +0.070 | +0.056 | +0.132 |
| Max. Expansion | +0.092 | +0.076 | +0.132 |
| Min. Contraction | +0.055 | +0.035 | |
| Change from Final set to 24 hours | −0.037 | −0.041 | |

*Table VI.—Modulus of rupture*

| Age in Days | Lbs. per sq. in. | | |
|---|---|---|---|
| | 4 | 5 | 6 |
| 1 | 930 | 1,090 | 880 |
| 3 | 1,190 | 1,240 | 1,140 |
| 7 | 1,480 | 1,550 | 1,480 |
| 14 | 1,750 | 1,880 | 1,640 |

Measurements in the latter set of tables are made as described in the former set.

In a preferred embodiment of this invention 50% of a magnesia having an iodine number of 5 to 7.5 is thoroughly mixed with 15% of magnesia having an iodine number of 18 to 22, and 35% of a magnesia having an iodine number of 15 to 18. All of these magnesia components are obtained by calcining to the respective activities magnesium hydroxide precipitated from seawater by treatment thereof with calcined dolomite and washing and filtering the precipitate so formed. The magnesia mixture is blended with other ingredients into a flooring composition in the following proportions: Magnesia, 25%; sand, passing 30 and retained on 60 mesh screen, 44.0%; silica flour, passing 200 mesh, 21.0%; asbestos, 1%; wood flour, 3.0%; color (iron oxide), 6.0%. This composition is gauged with magnesium chloride solution and exhibits the following characteristics:

| | | |
|---|---|---|
| Initial set | minutes | 135 |
| Final set | do | 255 |
| Maximum expansion | per cent | +0.20 |
| Minimum contraction | do | −0.18 |
| Total change | do | −0.38 |
| Change, final set to 24 hrs | do | +0.049 |

Cross bending strengths, in lbs. per sq. in.:
- 1 day — 1460
- 3 day — 1480
- 7 day — 1640
- 14 day — 1870
- 28 day — 1730

In the above test, marble dust can be used instead of the silica flour; and ground marble, in place of sand. Other color agents can be substituted for the iron oxide, or coloring material may be omitted.

In making up flooring compositions using seawater magnesias of the activities defined, from about 25% to 30% of the magnesia mixture is added in the composition. Preferably, about 25% of the mixed magnesias of 4 and of 15 to 22 iodine numbers, described above, is employed in such compositions. In other applications of the Sorel cements, the amount of magnesia mixture can vary well beyond these ranges; and the magnesia mixture is not only useful in flooring mixes but in many other applications of these cements.

When 30% of seawater magnesia having an iodine number of 36 is mixed with the commercial flooring composition and gauged with 20% aqueous $MgCl_2$ solution, all as described above, the initial set required 75 minutes and the final set, 150 minutes. The maximum expansion over a 24 hour period is 0.056 and the minimum contraction −0.430, total change being −0.486. This demonstrates the superiority of the mixed activities with respect to linear change.

This application is a continuation-in-part of my co-pending application, S. N. 637,118, which was filed December 22, 1945, and now abandoned.

The above description and examples have been given for purposes of illustration only, and it is to be understood that variations and modifications can be made therein without departing from the spirit and scope of this invention. In this specification and claims percentages are by weight, unless otherwise indicated. All percentages shown herein are in percent by weight, unless otherwise stated except that the expansion and contraction characteristics are in percent of linear change. Instead of a solution of magnesium chloride in water, the setting solution can be a solution of magnesium sulfate in water, or a solution of a mixture of magnesium chloride and magnesium sulfate. In the latter case, the mixture usually contains about 10 parts of magnesium sulfate to 90 parts by weight of magnesium chloride.

What is claimed is:

1. Process for making Sorel cement which comprises calcining a portion of magnesium hydroxide recovered by precipitation from a magnesium salt-containing solution, to magnesia having an iodine number of from 4 to 8, calcining another portion of said magnesium hydroxide to magnesia having an iodine number of from 15 to 40, admixing said magnesias in the proportions of from about 30% to about 70% of magnesia of iodine number 4 to 8 and from 70% to 30% of magnesia of iodine number from 15 to 40, and gauging said admixture with a water solution of at least one substance of the group consisting of magnesium chloride and magnesium sulfate.

2. Process as in claim 1 wherein the setting solution is aqueous magnesium chloride.

3. Process for making Sorel cement which comprises calcining a portion of magnesium hydroxide recovered by precipitation from seawater, to magnesia having an iodine number of from 4 to 8, calcining another portion of said magnesium hydroxide to magnesia having an iodine number of from 15 to 22, admixing said calcined magnesias in the proportion of from 30% to 40% of magnesia having an iodine number of 4 to 8 and from 60% to 70% of magnesia having an iodine number of from 15 to 22, and gauging said mixture with a water solution of at least one substance of the group consisting of magnesium chloride and magnesium sulfate.

4. Process of claim 3 wherein the setting solution is aqueous magnesium chloride.

5. Process of making magnesium oxychloride cement which comprises calcining a portion of magnesium hydroxide recovered by precipitation from seawater by reaction thereof with at least one material of the group consisting of lime and calcined dolomite, to obtain magnesia having an iodine number of about 36, calcining another portion of said magnesium hydroxide to obtain a second magnesia having an iodine number of about 4, admixing said magnesias in the proportion of from about 30% to about 40% of said first-mentioned magnesia and from about 70% to about 60% of said second magnesia, and gauging said mixture with aqueous magnesium chloride solution.

6. Process for making Sorel cement which comprises calcining a portion of magnesium hydroxide recovered by precipitation from seawater, to magnesia having an iodine number of from 4 to 8 and an ignition loss of about 1.0%, calcining another portion of said magnesium hydroxide to magnesia having an iodine number of from 15 to 40, admixing said magnesias in the proportions of from about 30% to about 70% of magnesia of iodine number 4 to 8 and from about 70% to about 30% of magnesia of iodine number 15 to 40, and gauging said admixture with a water solution of at least one substance of the group consisting of magnesium chloride and magnesium sulfate.

7. Process for making magnesium oxychloride flooring cement which comprises calcining a portion of magnesium hydroxide, recovered by precipitation from seawater by reaction thereof with at least one material of the group consisting of lime and calcined dolomite, to obtain magnesia having an iodine number of about 36, calcining another portion of said magnesium hydroxide to obtain a second magnesia having an iodine number of about 4, admixing said magnesias in the proportion of from 30% to 40% of said first-mentioned magnesia and from 70% to 60% of said second magnesia, admixing 30% by weight of said mixed magnesias and 70% by weight of a flooring composition consisting of a mixture of talc, wood flour, sand and asbestos, and adding thereto aqueous magnesium chloride solution.

8. Process for making magnesium oxychloride flooring cement which comprises preparing a magnesia mixture by admixing from 30% to 70% of a magnesia component having an iodine number of from about 4 to about 8 and from 70% to 30% of a magnesia component having an iodine number of from 15 to 40, said magnesia components being obtained by calcining magnesium hydroxide recovered by precipitation from a magnesium salt-containing solution, admixing from about 25% to about 30% by weight of said magnesia mixture and from 70% to 75% by weight of a flooring composition comprising a mixture of sand, talc, wood flour and asbestos, and admixing therewith aqueous magnesium chloride solution.

9. Process for making magnesium oxychloride flooring cement which comprises preparing a magnesia mixture by admixing from 30% to 40% of a magnesia component having an iodine number of from about 4 to about 8 and from 70% to 60% of a magnesia component having an iodine number of from 15 to 22, said magnesia components being obtained by calcining magnesium hydroxide recovered from seawater by treatment thereof with calcined dolomite, admixing 25% of said magnesia mixture and 75% of a flooring composition comprising a mixture of sand, talc, wood flour and asbestos, and admixing therewith aqueous magnesium chloride solution.

10. Process as in claim 9 wherein the magnesia component having an iodine number of from 15 to 22 consists of about equal parts of magnesia having an iodine number of from 15 to 18 and of magnesia having an iodine number of from 18 to 22.

11. Process for making Sorel cement which comprises calcining a portion of magnesium hydroxide recovered by precipitation from sea water to magnesia having an iodine number of from 4 to 8, calcining another portion of said magnesium hydroxide to magnesia having an iodine number of from 15 to 22, admixing said magnesias in the proportion of from 30% to 40% of magnesia having an iodine number of 4 to 8 and from 60% to 70% of magnesia having an iodine number of from 15 to 22, and gauging said mixture with a water solution of a mixture consisting of 90% magnesium chloride and 10% magnesium sulfate.

12. A cementitious composition suitable for forming Sorel cement which comprises a magnesia mixture consisting of from 30% to 70% of a component which is magnesium hydroxide precipitated from an aqueous magnesium salt solution and calcined to magnesia of iodine number from 4 to 8 and from 70% to 30% of a component which is magnesium hydroxide precipitated from an aqueous magnesium salt solution and calcined to magnesia of iodine number from 15 to 40.

TEYNHAM WOODWARD.

No references cited.